(12) United States Patent
Lülfing

(10) Patent No.: US 6,478,384 B2
(45) Date of Patent: *Nov. 12, 2002

(54) HYDRAULIC BRAKING SYSTEM

(75) Inventor: Ralph-Carsten Lülfing, Garbsen (DE)

(73) Assignee: WABCO GmbH, Hannover (DE)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/467,640

(22) Filed: Dec. 20, 1999

(65) Prior Publication Data

US 2002/0033636 A1 Mar. 21, 2002

(30) Foreign Application Priority Data

Dec. 23, 1998 (DE) .......................... 198 59 737

(51) Int. Cl.⁷ .............................................. B60T 17/16
(52) U.S. Cl. ......................................... 303/89; 188/353
(58) Field of Search ............................. 188/353; 303/89

(56) References Cited

U.S. PATENT DOCUMENTS

| 3,771,839 A | | 11/1973 | Fink | |
|---|---|---|---|---|
| 4,428,621 A | * | 1/1984 | Taki et al. | 303/13 |
| 4,824,178 A | * | 4/1989 | Peterson | 303/15 |
| 4,861,115 A | * | 8/1989 | Peterson | 303/15 |
| 5,066,075 A | * | 11/1991 | Kaneda et al. | 303/133 R |
| 5,599,073 A | * | 2/1997 | Huh | 303/3 |
| 5,967,628 A | * | 10/1999 | Abe | 303/122.12 |

FOREIGN PATENT DOCUMENTS

| DE | 39 00 850 C | 3/1990 |
|---|---|---|
| DE | 39 21 309 | 1/1991 |
| DE | 44 45 401 A1 | 6/1995 |
| DE | 195 46 056 | 6/1997 |
| WO | WO 96/35598 | 11/1996 |
| WO | WO 97/14592 | 4/1997 |
| WO | WO 97/21574 | 6/1997 |

OTHER PUBLICATIONS

"HPB Hydraulic Power Braking System," *Wabco*, Aug. 1997 Edition, pp. 1–3, 10.
"Hydraulische Pumpenspeicher—Bremsanlagen," *Wabco*, Jul. 1995 Edition, pp. 13, 12.
"Das neue Fahrsicherheitssystem Electronic Stability Program von Mercedes–Benz," Von Armin Müller et al., *ATZ Automobiltechnische Zeitschrift 96*, vol. 11, 1994, pp. 656–670.

* cited by examiner

*Primary Examiner*—Matthew C. Graham
*Assistant Examiner*—Bradley King
(74) *Attorney, Agent, or Firm*—Proskauer Rose LLP

(57) ABSTRACT

A hydraulic braking system for wheel-borne devices permits brake actuation independent of operator-actuation of a normal brake valve. A braking circuit includes a flow line, a return line, and one or more wheel brakes. An electrically actuated valve system is installed parallel to the brake valve, which connects the wheel brakes to the flow line when actuated, and closes off the return line. Motor vehicles represent an important area of application for the invention.

6 Claims, 3 Drawing Sheets

HYDRAULIC BRAKING SYSTEM

BACKGROUND OF THE INVENTION

The present invention relates to a hydraulic braking system, and more particularly to a hydraulic braking system having a braking circuit including a flow line, a brake circuit valve, a return line and at least one wheel brake, and in which the wheel brake is connectable alternatively to the flow line or to the return line by operation of the brake circuit valve.

A braking system of this type, having a second braking circuit added, is known, for example, from the WABCO brochure "Hydraulische Pumpenspeicher-Bremsanlagen" of June 1995, as disclosed on page 12 thereof, and in its equivalent "HPB Hydraulic Power Braking System" of August 1996, on page 10 thereof, which are incorporated herein by reference. Such braking systems are normally used in wheel-borne devices, wherein the term "wheel-borne devices" is understood to be all transportation, work and pulling machines, such as earth moving machines, loading machines, agricultural vehicles, rail vehicles, as well as road and off-the-road motor vehicles. Devices running on tracks, such as planing and loading caterpillars, are also considered to be wheel-borne devices, insofar as wheels thereof transmit the loads and the driving forces to the tracks.

Frequently, actuation of such a braking system independently of the brake valve may be required. Such a need arises, for example, when an excavator, a mobile crane or an agricultural tractor are used at a fixed location, or when a motor vehicle is to be equipped with a start-up slip control system and/or a travel dynamic control system.

It is therefore the object of the present invention to further develop a hydraulic braking system of the above-mentioned type in a simple manner, such that brake actuation independent of brake valve operation is made possible.

SUMMARY OF THE INVENTION

In accordance with these and other objects of the invention, there is provided a hydraulic braking system for a wheel-borne device which has a braking circuit including a flow line, a brake circuit valve, a return line and at least one wheel brake. The wheel brake is connectable alternatively to the flow line or to the return line by operation of the brake circuit valve. An electrically actuated valve system is further provided. When actuated, the electrically actuated valve system connects the wheel brake to the flow line parallel to the brake circuit valve and closes off the return line.

The above, and other objects, features and advantages of the present invention will become apparent from the following description read in conjunction with the accompanying drawings, in which like reference numerals designate the same elements and functions.

DETAILED DESCRIPTION OF THE PREFERRED EMBODIMENT

Figure 1:
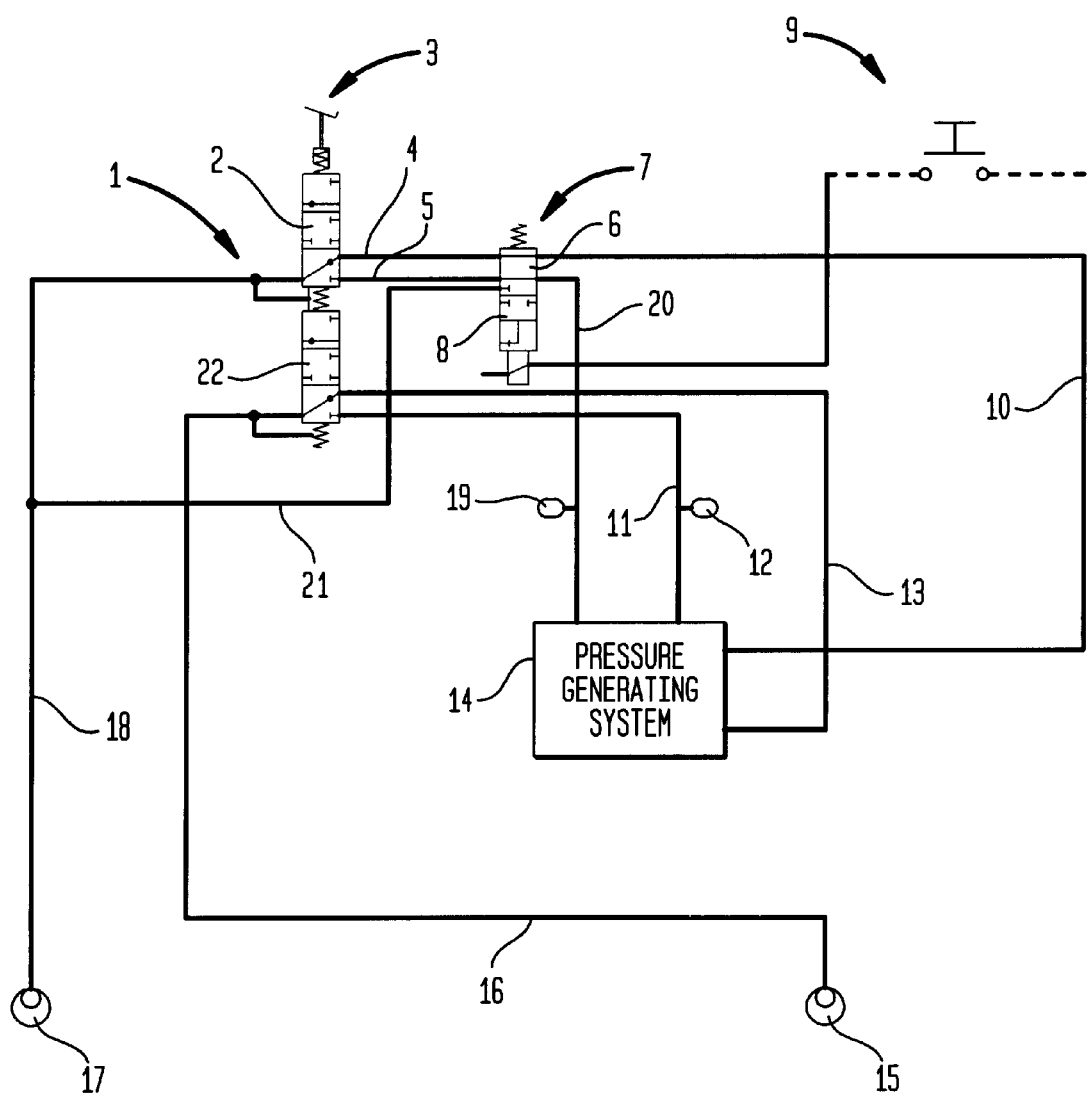
FIG. 1 is a schematic representation of a hydraulic multi-circuit braking system in accordance with an embodiment of the invention.

Referring now to the figures, and in particular FIG. 1, a two-circuit embodiment of a multi-circuit braking system is depicted, and which includes a first braking circuit with a flow line 5, 20, a first brake circuit valve 2, a wheel brake 17, and a return line 4, 10. The multi-circuit braking system further includes a second braking circuit with a flow line 11, a second brake circuit valve 22, a wheel brake 15, and a return line 13. The flow lines 5, 20 or 11 are each connected to a pressure storage 19 or 12.

A pressure generating system, represented in the form of a box bearing the reference numeral 14, serves to supply pressure to the braking system. Normally, a pump, at least one atmospheric return collector, and additional equipment required for different applications, such as braking system safety devices and pressure regulating devices, are installed in the pressure generating system 14.

The brake circuit valves 2, 22 are combined into a brake valve 1. In order to permit actuation by the operator, the brake valve 1 includes an actuating element 3, which may be provided, for example, conveniently in the form of a pedal.

Each wheel brake 17 or 15 can be the sole brake of the respective braking circuit, but as a general rule, is representative of several wheel brakes.

Each of the brake circuit valves 2, 22 is connected at one input to a corresponding delivery connection of the pressure generating system 14 and to the respective pressure storage 19 or 12 via the corresponding flow line 5, 20 or 11. A work output of each of the brake circuit valves 2, 22 is connected to the respective wheel brake 17 or 15 via a corresponding brake line 18 or 16. Furthermore, a return line connection provided in each of the brake circuit valves 2, 22 is connected to a corresponding return line connection of the pressure generating system 14. The second brake circuit valve 22 is furthermore provided with a hydraulic control system, which is connected to the brake line 18 of the first braking circuit. As a general rule, the required connection extends within the brake valve 1.

An electrically actuated valve system 7 is also part of the braking system. The actuating system for the valve system 7, which is generally provided in the form of a magnet, can be connected via a switch 9 to a power source for actuating the valve system 7.

The switch 9 may be part of an electrical control system.

The valve system 7 contains three flow paths. The first flow path is located in the return line 4, 10 of the first braking circuit. The second flow path is located in the flow line 5, 20 of the first braking circuit. The third flow path branches off from the second flow path to a circumventing line 21, which is parallel to the first brake circuit valve 2, leading to the brake line 18 of the first braking circuit.

In its inactive state, the valve system 7 assumes a starting position 6, in which the first and second flow paths thereof are open, and thereby also the flow line 5, 20, as well as the return line 4, 10, while the third flow path of the valve system 7 is closed off.

When actuated, the valve system 7 assumes an operating position 8 in which the first flow path thereof is closed off, and thereby also the return line 4, 10, while the second and third flow paths thereof are held open, thereby connecting the brake line 18 to the pressure generating system 14 and the pressure storage 19 via the circumventing line 21 and the flow line 5, 20 of the first braking circuit.

During normal operation of the braking system, the valve system 7 is in the starting position 6.

When the operator actuates the brake valve 1 in this operating state by means of the actuating element 3, the first brake circuit valve 2 allows a braking pressure to pass from the corresponding flow line 5, 20 into the brake line 18, and thereby to the wheel brake 17. The braking pressure has a value which is dependent upon the operator force exerted upon the actuating element 3 and/or upon the actuation stroke thereof, up to a maximum equal to the storage pressure.

When the operator removes the operator force and/or the actuation stroke entirely or in part, the first brake circuit valve 2 opens the connection between the brake line 18 and the corresponding return line 4, 10, until the braking pressure has been reduced to a value corresponding to the new operator force and/or the new actuating stroke.

As described thus far, the valve system 7 would also operate if the first braking circuit were the only one present. Assuming that the second braking circuit does not in fact exist, the embodiment therefore also represents an example of a single braking system.

The current braking pressure in the brake line 18 is also transmitted to the control system of the second brake circuit valve 22, whereupon the second brake circuit valve 22 allows a braking pressure to pass from the corresponding flow line 11 into the respective brake line 16 and thereby to the wheel brake 15, or vents the braking pressure from the brake line 16 into the corresponding return flow line 13. Depending on the particular design, the braking pressure of the second braking circuit can be equal to the braking pressure of the first braking circuit, or may be reduced to a lower pressure than same, or may be increased over it, to the extent permitted by the storage pressure. The second braking circuit can thus be actuated with the first braking circuit by means of the valve system 7, without additional expenditure.

Operation of the brake valve 1 can be described briefly by stating that the first brake circuit valve 2 is actuated directly by the operator while the second brake circuit valve 22 is hydraulically controlled by the first brake circuit valve 2.

For purposes of explanation, it is to be assumed that initially the brake valve 1 is not actuated. When the operator subsequently actuates the valve system 7 by closing the switch 9, the valve system 7 is moved to its operating position 8 and allows the full storage pressure to flow via the third flow path thereof from the flow line 5, 20 of the first braking circuit into the circumventing line 21, and thereby into the brake line 18 and into the wheel brake 17 of the first braking circuit. This pressure, in turn, also controls the second brake circuit valve 22, such that the second brake circuit valve 22, depending upon its design, again allows an equally strong or a corresponding braking pressure to flow from its assigned flow line 11 into the corresponding brake line 16, and thus into the wheel brake 15.

The valve system 7 thus enables the operator to actuate the braking system independently of the brake valve 1. The device equipped with such braking system can therefore be held in a stopped position independently of the brake valve 1, so that the operator is relieved from having to actuate the brake valve 1 while executing other operational steps.

Any contemporaneous additional actuation of the brake valve 1 by the operator has no effect. If the wheel brakes 15, 17 are actuated by the brake valve 1 with a braking pressure below the storage pressure, this actuation is replaced by the actuation effected by means of the valve system 7.

During actuation of the braking system by means of the valve system 7, closure of the return line 4, 10 is required to allow a pressure build up during this actuation in the wheel brakes 15, 17 and in the corresponding brake lines 16, 18. If the return line 4, 10 were not closed in such instance, the first braking circuit would become inactive since a short-circuit would then occur in the first braking circuit through the first brake circuit valve 2 which would then be subjected to pressure "in reverse" in this operating mode, resulting in a total loss of pressure. As a result of the inactuation of the first braking circuit, the second braking circuit would also be inactive since there would be no ability to control it.

The aforementioned "reverse" pressurization of the first brake circuit valve 2 may lead to malfunctions in some of the usual designs of the brake valve 1, for example, a control piston may be pushed out. Measures to prevent such malfunctions must be applied when necessary, for example, by means of a stop for the control piston.

In addition, the return flow lines 4, 10 or 13 of the two braking circuits can be combined upstream, i.e. also inside the brake valve 1, or downstream of the valve system 7.

Figure 2:
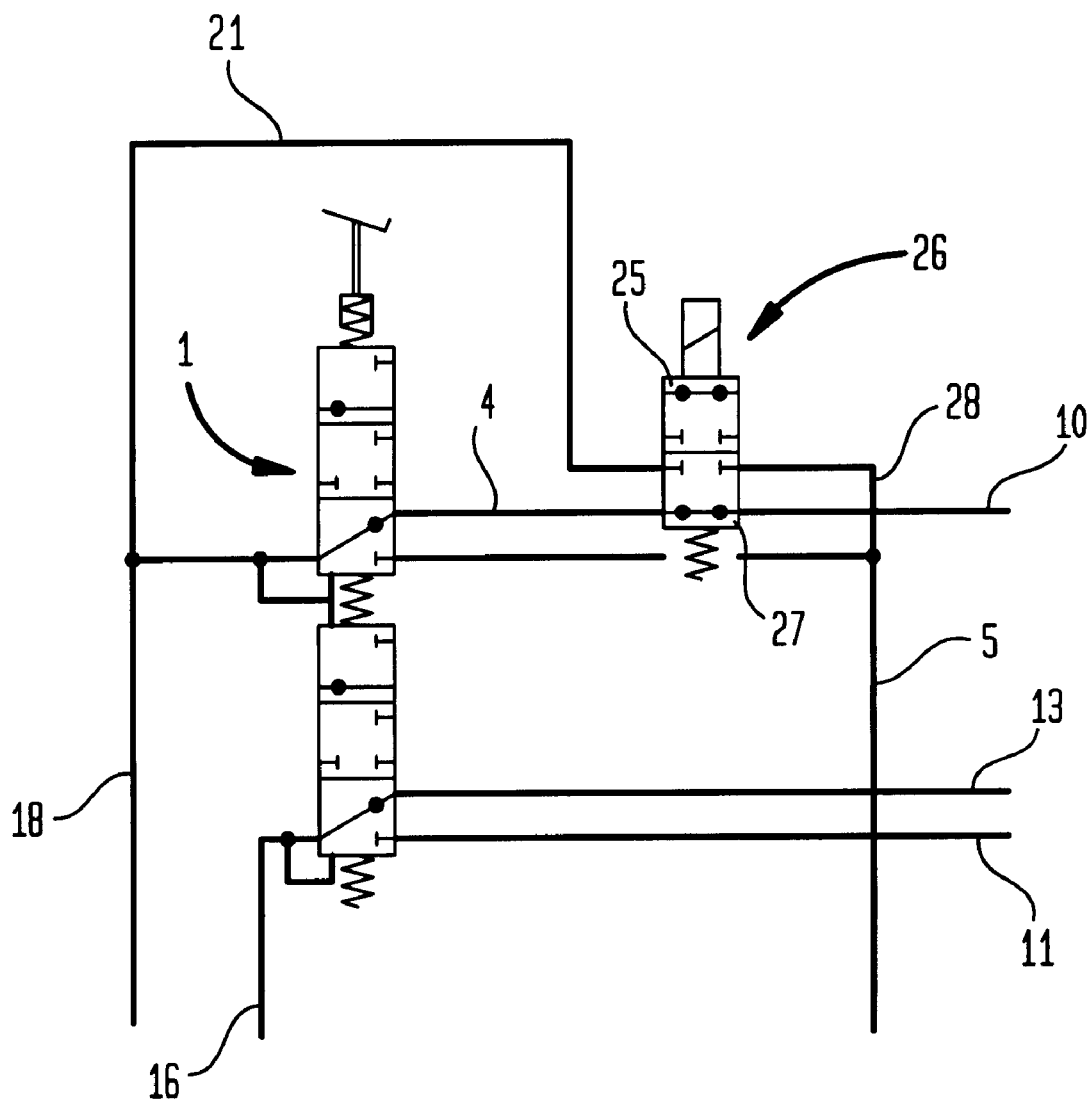
FIG. 2 is a detail schematic view of a further development of the system according to FIG. 1.

In a further development of the braking system, as shown in the detail of FIG. 2, the valve system 7 is replaced by a valve system 26 with two flow paths. The first flow path is again provided in the return line 4, 10 of the first braking circuit. The second flow path is located between a line 28 and the circumventing line 21. The line 28 branches off from the flow line 5, 20 of the first braking circuit.

In its starting position 27, the valve system 26 keeps its first flow path, and thereby the return line 4, 10, open, while it closes its second flow path. In its operating position 25, the valve system 26 closes the first flow path, and thereby also the return line 4, 10, while holding its second flow path open, and thereby connects the circumventing line 21 via the line 28 and the flow line 5, 20 to the pressure generating system 14 and the pressure storage 19, thereby achieving the same effect regarding the actuation of the braking system as described earlier.

While the valve system 7 of FIG. 1 is a 5/2 way valve, the valve system 26 is a 4/2 way valve.

Figure 3:
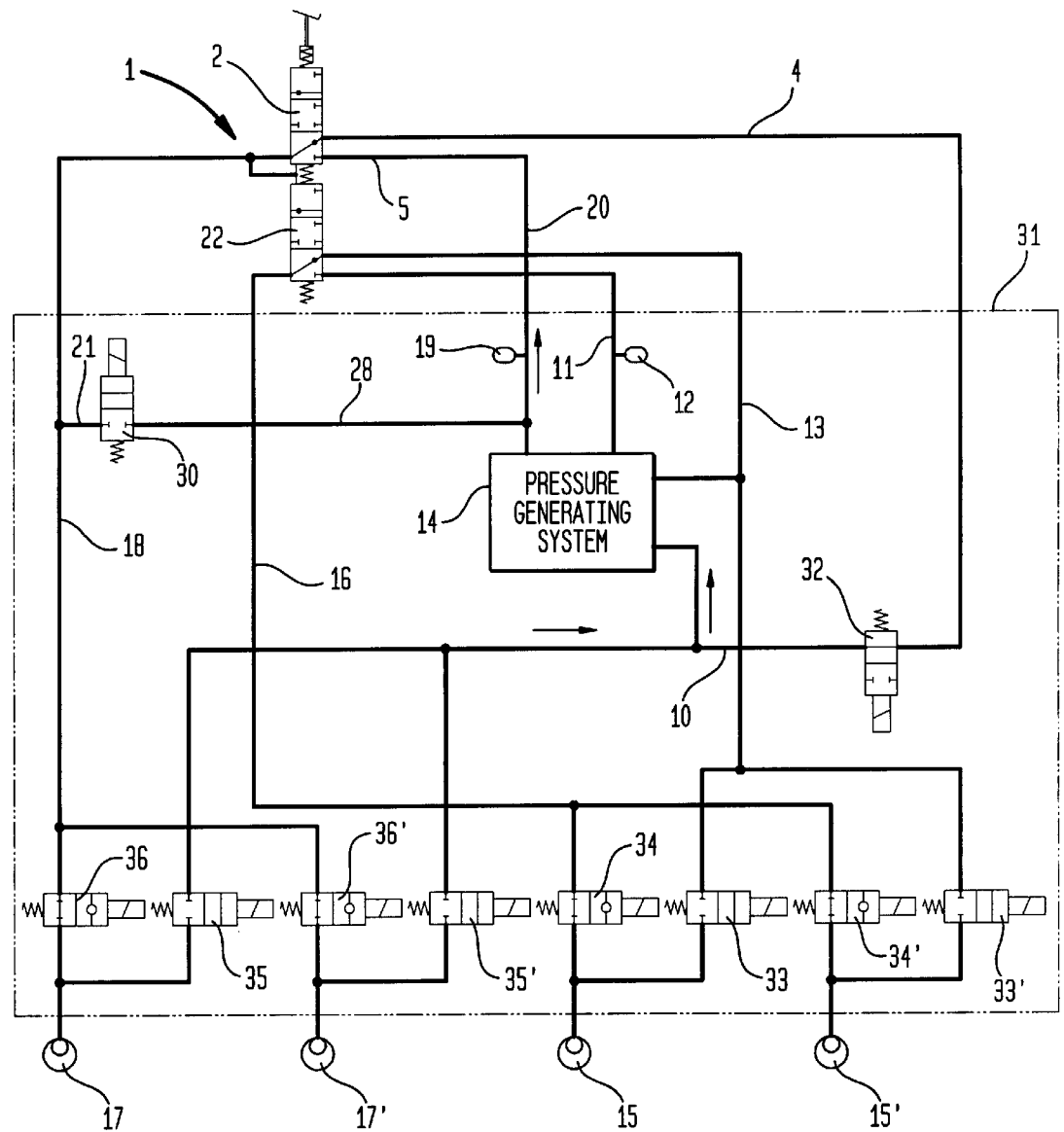
FIG. 3 is a schematic representation of a hydraulic multi-circuit braking system in accordance with another embodiment of the invention.

Turning now to FIG. 3, a braking system with two circuits is depicted, in which each of the braking circuits has two wheel brakes 17, 17' or 15, 15'. The brake lines 18, 16 going out from the brake circuit valves 2, 22 branch off to the individual wheel brakes in such manner that the branch of the brake line 18 of the first braking circuit is downstream of the inlet of the circumventing line 21.

Two branch lines also go from the return lines 4, 10 or 13 to the individual wheel brakes 17, 17' or 15, 15' of the respective braking circuit. Regulating valve systems 33, 34 or 33', 34' or 35, 36 or 35', 36' are provided upstream of the individual wheel brakes 15, 15', 17, 17'. They are identical for the wheel brakes of one braking circuit or for all wheel brakes.

The regulating valve systems 33 to 36' are able to connect the corresponding wheel brake 15, 15', 17, 17' to the respective brake line 16 or 18 or to the respective return line 4, 10 or 13, depending upon the electrical actuation, or to close both connections. Such regulating valve systems are normally used in ABS-protected vehicle brake systems as ABS valves., and are known, for example, from EP-B-0 355 324 (U.S. Pat. No. 4,971,403), which is incorporated herein by reference.

The electrically actuated valve system in this braking system bears the numerals 30, 32 and consists of two 2/2 way valves 30 and 32. The flow path of one 2/2 way valve 30 is located between the line 28 branching off from the flow line 5, 20 and the circumventing line 21, while the flow path of the second 2/2 way valve 32 is located in the return line 4, 10. The positions of the 2/2 way valves 30 and 32 are not referenced further. However, as shown in FIG. 3, the starting position of the one 2/2 way valve 30 is a locking position and its operating position is a flow position, while the starting position of the second 2/2 way valve 32 is a flow position and its operating position is a locking position. The branching off of the return line 4, 10 to the corresponding wheel brakes 17, 17' must be located downstream of the second 2/2 way valve 32.

To actuate the braking system by the valve system 30, 32, both 2/2 way valves 30, 32 must be actuated, i.e. switched to their operating positions simultaneously. The present embodiment provides the advantage that the 2/2 way valves or at least a portion of same can be obtained from the mass production of ABS valves and are accordingly economical.

A broken line 31 indicates that all or several of the enclosed parts of the installation can be combined into one or several components.

The regulating valve systems 33 to 36' make it possible, in a known manner, to adjust the braking pressure transmitted to the different corresponding wheel brakes 15, 15', 17, 17' between atmospheric pressure and the braking pressure allowed to pass the brake by valve 1 and to thereby actuate them in individual steps.

The same possibility is provided by the regulating valve systems 33 to 36' when the valve system 30, 32 is actuated, however, with the value of the stored pressure as the upper limit.

This braking system can therefore be used advantageously in instances in which the wheel brakes must be actuable independently of the operator's wishes.

Examples of such instances include motor vehicles with start-up slip regulation (SUSR), (ASR) and/or travel dynamic regulation (TDR), (FDR). In such motor vehicles, the valve system 30, 32 is actuated, supplementary or exclusively, as a function of certain travel conditions, by an electronic control system, while the regulating valve systems 33 to 36' allocate the braking pressure going to one or several wheel brakes, also as a function of the travel conditions, thus actuating one or several of the respective wheel brakes in a graduated manner. In carrying out this process, all suitable means and associated sensing devices can be used for the control of braking pressure.

Further details concerning the SUSR (ASR) and the TDR (FDR) can be found in WO 96/35598, incorporated herein by reference, or in the article "Das neue Fahrsicherheitssystem Electronic Stability Program von Mercedes-Benz" in ATZ 96 (1994), volume 11.

The above explanations, given in regard to the second braking circuit, apply directly or correspondingly in a braking system in which one or more additional braking circuits are used, insofar as their brake circuit valves are also controlled hydraulically by the first brake circuit valve.

In a manner not shown here, one or several braking circuits can also be designed such that all wheel brakes are preceded by a common regulating valve system. It is possible, for instance, to install separate regulating valve systems only upstream of the wheel brakes of a braking circuit associated to a driven axle. A SUSR (ASR) would not be affected by this.

All of the valve systems are shown in the figures with basic symbols and function symbols according to the international standard ISO 1219. Valve systems designed accordingly are known to the person schooled in the art or can easily be implemented in practice by such a person, as illustrated for example, by the previously mentioned WABCO brochures "Hydraulische Pumpenspeicher-Bremsanlagen" and "HPB Hydraulic Power Braking Systems."

In all other matters, the explanations regarding a particular exemplary embodiment also apply to the other exemplary embodiments, barring anything to the contrary in these explanations. The valve systems of the individual embodiments, in particular, are interchangeable or can be replaced by one another by adaptations with which a person schooled in the art would be familiar.

Having described preferred embodiments of the invention with reference to the accompanying drawing, it is to be understood that the invention is not limited to those precise embodiments, and that various changes and modifications may be effected therein by one skilled in the art without departing from the scope or spirit of the invention as defined in the appended claims.

What is claimed is:

1. A hydraulic braking system for a wheel-borne device, comprising:

a braking circuit including a pressure generating system, a flow line, a brake circuit valve, a return line, and at least one wheel brake, said wheel brake being connectable alternatively to the flow line or to the return line by operation of the brake circuit valve; and an electrically actuated valve system comprising an inlet component and an outlet component, the inlet component being located in a portion of the flow line which bypasses the brake circuit valve, so that upon actuation of said inlet component, said wheel brake is connected to the flow line while bypassing said brake circuit valve, and said outlet component being positioned in a portion of the return line between said brake circuit valve and said pressure generating system, wherein said outlet component closes off said return line portion upon being actuated.

2. A hydraulic braking system according to claim 1, wherein:

said outlet component is located in said return line downstream of said brake circuit valve.

3. A hydraulic braking system according to claim 2, wherein:

said outlet component is actuated simultaneously with actuation of the inlet component.

4. A hydraulic braking system according to claim 2, wherein said inlet component and said outlet component are integrated into a single valve device wherein said outlet component is actuated simultaneously with actuation of said inlet component.

5. A hydraulic braking system according to claim 2, further comprising:

an additional electrically actuated regulating valve system located in the flow line upstream of said wheel brake, said additional regulating valve system comprising an inlet valve device and an outlet valve device, said inlet valve device being located in the flow line downstream of the brake circuit valve and the inlet component of the electrically actuated valve system.

6. A hydraulic braking system according to claim 5, wherein:

said braking circuit includes at least two wheel brakes and an additional electrically actuated regulating valve system for each of said at least two wheel brakes.

* * * * *